(12) United States Patent
Ati

(10) Patent No.: US 6,463,204 B1
(45) Date of Patent: Oct. 8, 2002

(54) MODULAR LIGHTPIPE SYSTEM

(75) Inventor: Babi P. Ati, Plano, TX (US)

(73) Assignee: Fujitsu Network Communications, Inc., Richardson, TX (US)

( * ) Notice: Subject to any disclaimer, the term of this patent is extended or adjusted under 35 U.S.C. 154(b) by 0 days.

(21) Appl. No.: 09/216,895

(22) Filed: Dec. 18, 1998

(51) Int. Cl.[7] ............................................. G02B 6/00
(52) U.S. Cl. ......................................... 385/147; 385/146
(58) Field of Search ........................... 385/147, 53, 146

(56) References Cited

U.S. PATENT DOCUMENTS 5,327,328 A * 7/1994 Simms et al. ................. 362/26
5,883,994 A * 3/1999 Snyder ......................... 385/50

OTHER PUBLICATIONS

"Chicago Miniature" catalog, *Chicago Minature*, pp. 4 through 8.*
"Dialight" catalog, *Dialight Corporation*, pp. 2–16 through 2–27.*

* cited by examiner

Primary Examiner—Frank G. Font
Assistant Examiner—Andrew H. Lee
(74) Attorney, Agent, or Firm—Baker Botts L.L.P.

(57) ABSTRACT

A lightpipe system for transferring light from light sources on a printed circuit board (PCB), such as light-emitting diodes (LEDs), to a display includes modular lightpipes coupled together. Each modular lightpipe couples to an adjacent modular lightpipe to form an integrated lightpipe system. All or selected numbers of the lightpipes may include detachable tabs, proturbances, pegs, or other structures to ensure proper alignment of the lightpipe system and attachment of the lightpipe system to the PCB.

35 Claims, 2 Drawing Sheets

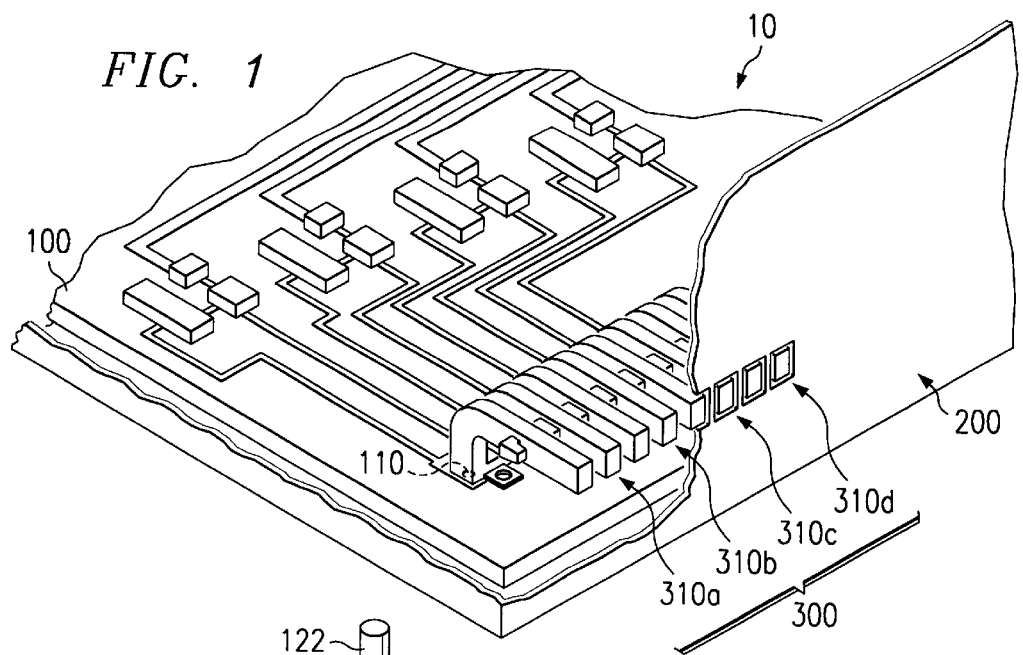
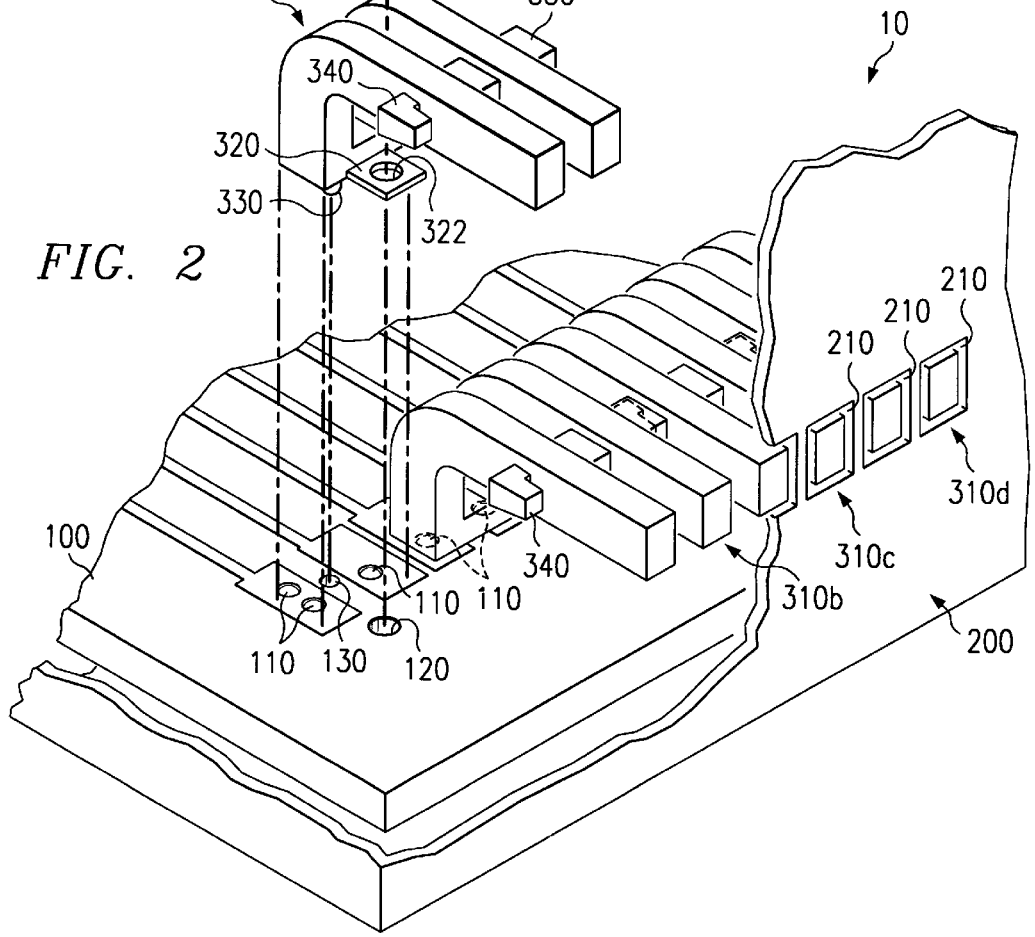

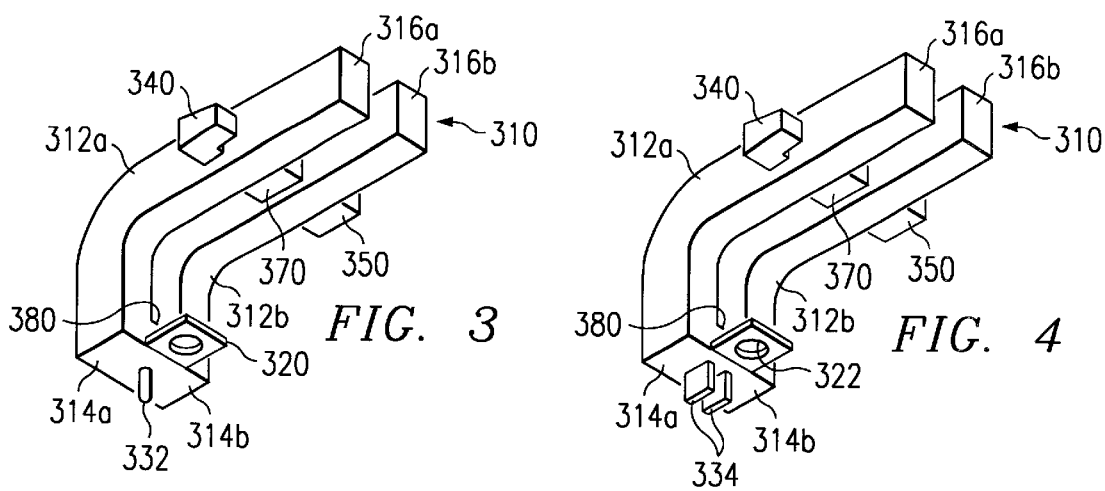
FIG. 3
FIG. 4
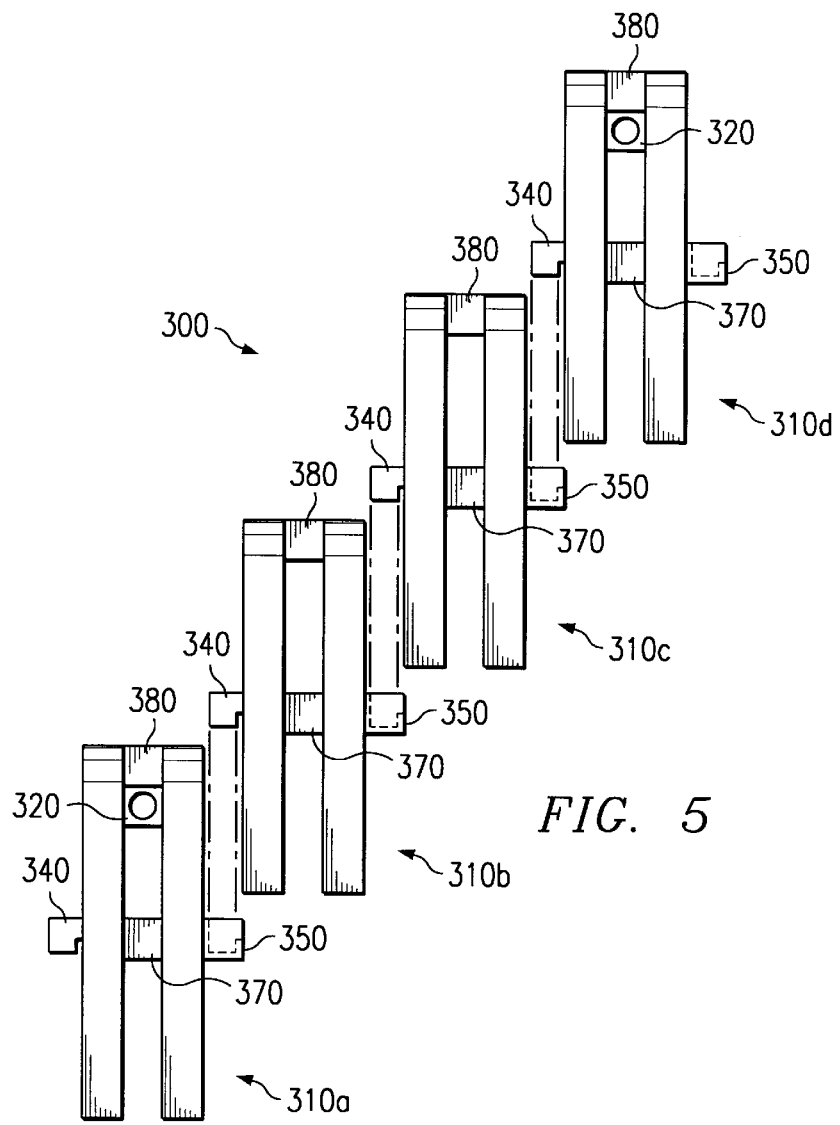
FIG. 5

MODULAR LIGHTPIPE SYSTEM

TECHNICAL FIELD OF THE INVENTION

This invention relates to light transfer devices, and more particularly to a modular lightpipe system.

BACKGROUND OF THE INVENTION

A lightpipe transfers light from one place to another. To accomplish this, the lightpipe receives light at one of its apertures and internally reflects the light to exit at its other aperture. Thus, the lightpipe provides a channel for the light. A lightpipe may contain curves as long as the critical angle of the material, such as plastic or glass, is not exceeded.

Lightpipes have a variety of uses. Commonly, they find use in transferring light from a light-emitting diode (LED) on a printed circuit board (PCB) to a visual display. When used in this manner, a lightpipe can transfer light from surface mounted LEDs or through hole LEDs. However, the alignment of the lightpipe with the LED and the visual display can prove critical in ensuring proper illumination at the display end of the lightpipe.

Often PCBs include several LEDs in an array. To project light from the LEDs to a visual display, the PCB designer must either purchase a set of permanently connected lightpipes from a manufacturer's existing stock or have a set of permanently connected lightpipes specially made. Unfortunately, having a set of lightpipes specially made can be expensive due to tooling costs.

SUMMARY OF THE INVENTION

In accordance with the present invention, the disadvantages and problems associated with previous lightpipe systems have been substantially reduced or eliminated. The present invention provides a modular lightpipe system that reduces PCB design and manufacturing cost.

In one embodiment of the present invention, a lightpipe system for transferring light from light-emitting diodes (LEDs) on a printed circuit board (PCB) to a visual display includes a number of modular lightpipes coupled together. In another embodiment, an electronic assembly includes a printed circuit board (PCB) having a number of light sources, a display, and a number of modular lightpipes coupled together and operable to communicate light from the light sources to the display. In yet another embodiment, a modular lightpipe includes a first coupler, a second coupler, a spacer, a first transfer channel disposed between the first coupler and the spacer, and a second transfer channel disposed between the second coupler and the spacer.

The present invention provides several important technical features and advantages. First, each modular lightpipe can be coupled to another modular lightpipe to form a lightpipe system. This allows the PCB designer to select the appropriate number of lightpipes for a particular LED configuration using a single lightpipe configuration. This results in reduced tooling costs. In a particular embodiment, each lightpipe includes two transfer channels to support the communication of light to two windows of the visual display. These modular lightpipes may then be coupled together to form an array that supports a display of four, six, eight, and more windows using a single modular lightpipe structure. Generally, the present invention contemplates the modular construction of a variety of light displays arranged in a linear array, two-dimensional array, or other suitable configuration using one or more modular lightpipes.

Other technical advantages include a modular lightpipe having a detachable tab and/or post. These detachable tabs and/or posts allow the lightpipe, system to attach to the PCB at a reduced number of points, for example, on the ends of a linear array of modular lightpipes. Lowering the number of attachment points to the PCB decreases engineering costs, production costs, and the overall footprint of the lightpipe system on the PCB. Tabs and/or posts that are not detached align the lightpipe system with the LEDs and the visual display and secure the lightpipe system to the PCB. Other technical advantages will be readily apparent to one skilled in the art from the following figures, description, and claims.

BRIEF DESCRIPTION OF THE DRAWING

For a more complete understanding of the present invention and for further features and advantages, reference is now made to the following description taken in conjunction with the accompanying drawings, where like reference numerals represent like parts, in which:

FIG. 1 illustrates an electronic assembly having a lightpipe system coupled to a PCB for transferring light from a number of LEDs on the PCB to a visual display;

FIG. 2 illustrates a modular lightpipe of the lightpipe system detached from the PCB;

FIG. 3 is an underside three-dimensional (3D) view of the modular lightpipe;

FIG. 4 is an underside 3D view of an alternative configuration of the modular lightpipe; and FIG. 5 is a top view of the lightpipe system that shows the coupling between adjacent modular lightpipes.

DETAILED DESCRIPTION OF THE INVENTION

FIG. 1 illustrates an electronic assembly 10 having a lightpipe system 300 attached to a printed circuit board (PCB) 100 for transferring light from a plurality of light sources 110 on PCB 100 to a visual display 200. Lightpipe system 300 allows modular construction of a variety of light displays using one or more modular lightpipes 310. Generally, lightpipe system 300 transfers light generated by PCB 100 to visual display 200 to permit a user to visually assess the operation and condition of electronic assembly 10. PCB 100 contemplates any collection of electronic components.

The illustrated lightpipe system 300 includes four modular lightpipes 310a, 310b, 310c, 310d (generally referred to as modular lightpipes 310) each supporting two windows 210 in visual display 200. Lightpipe system 300 may include more or less than four modular lightpipes 310 arranged in a linear fashion, a two-dimensional array, or other suitable configuration. Each modular lightpipe 310 may be formed from plastic (e.g., polycarbonate), glass, or other suitable light conducting material.

FIG. 2 illustrates modular lightpipe 310a of lightpipe system 300 detached from the surface of PCB 100. With modular lightpipe 310a detached from the surface of PCB 100, light sources 110 become directly observable. Light sources 110 may be surface-mounted light-emitting diodes (LEDs), protruding or hole LEDs, or any other suitable light source. Modular lightpipe 310 transfers the light emitted by light sources 110 to windows 210 in visual display 200. In a particular embodiment, modular lightpipe 310 supports two or more light sources 110 for a single window 210 in visual display 200 to convey information on the operation and condition of electronic assembly 10 in more than one color of light (e.g., red, yellow, green).

Modular lightpipes 310 are coupled together by first couplers 390 and second couplers 350. Each modular lightpipe 310 may include both a first coupler 340 and a second coupler 350. Thus, modular lightpipes 310a and 310d, the exterior units of lightpipe system 300, possess either an unused first coupler 390 or an unused second coupler 350. Modular lightpipes 310a and 310d include a detachable tab 320 and/or a detachable protuberance 330 to attach and align lightpipe system 300 to PCB 100. Each tab 320 defines a hole 322 to receive a rivet, screw, or other suitable fastener 122. PCB 100 includes a tab hole 120 corresponding to each tab 320 and a protuberance hole 130 corresponding to each protuberance 330. In a particular embodiment, each protuberance 330 mates in a press fit to a corresponding proturbance hole 130 of PCB 100. In addition to or in lieu of tabs 320 and/or proturbances 330, modular lightpipe 310 may couple to PCB 100 using an ultrasonic heat stick, adhesive, or other suitable coupling.

Modular lightpipes 310b and 310c, the inner units of lightpipe system 300, align and attach to PCB 100 through their couplings to modular lightpipes 310a and 310d. Modular lightpipes 310b and 310c may include tabs 320 and/or protuberances 330 like modular lightpipes 310a and 310d. However, tabs 320 and/or protuberances 330 for modular lightpipes 310b and 310c may be removed before assembling lightpipe system 300 to reduce tooling costs for PCB 100 and to decrease the overall surface footprint of lightpipe system 300.

FIG. 3 is an underside three dimensional (3D) view of modular lightpipe 310 before assembly into lightpipe system 300. Modular lightpipe 310 includes transfer channel 312a and transfer channel 312b (referred to generally as transfer channel 312) spaced apart by first spacer 370 and second spacer 380. Each transfer channel 312 includes a first aperture 314 to receive light from one or more light sources 110 corresponding to transfer channel 312. In a particular embodiment, a single transfer channel 312 may receive light from two or more light sources 110 having different colors to provide a color-encoded visual status or condition of electronic assembly 10 at window 210 of visual display 200. Each transfer channel 312 also includes a second aperture 316 to emit light at the visual display 200. Spacers 370 and 380 provide support and alignment for first transfer channel 312 and second transfer channel 319. Second spacer 380 may prevent cross bleeding of light sources 110 to adjacent transfer channels 312. Depending on the span of transfer channels 312, the material used to construct modular lightpipe 310, and other factors, each modular lightpipe 310 may include one or more spacers along the length of transfer channel 312 or an integral support extending substantially along the length of transfer channel 312.

In the illustrated embodiment, protuberances 330 are posts 332. Each post 332 press fits into a corresponding protuberance port 130 in PCB 100 to align and assist in securing modular lightpipes 310 to PCB 100. Although each modular lightpipe 310 shown includes two transfer channels 312, each modular lightpipe 310 may include one or more transfer channels 312. For modular lightpipes 310 having more than two transfer channels 312, spacers 370 and 380 may be placed between adjacent transfer channels 312. Although shown having a rectangular cross section, transfer channels 312 may include other suitable cross sections, such as circular, square, or oval. In a particular embodiment, all components of modular lightpipe 310 are integrally formed from the same light conducting material, such as plastic (e.g., polycarbonate) or glass.

FIG. 4 is an underside 3D view of an alternative configuration of modular lightpipe 310, presenting another embodiment of protuberance 330. In this embodiment, each protuberance 330 includes one or more tabs 339. Each tab 334 or tab set extends through an associated protuberance port 130 in PCB 100 to align and assist in securing modular lightpipe 310 to PCB 100.

FIG. 5 is a top view of lightpipe system 300 that demonstrates the interaction between first coupler 390 of a first modular lightpipe 310 and second coupler 350 of an adjacent modular lightpipe 310. In a particular embodiment, first coupler 340 is a male coupling and second coupler 350 is a female coupling to engage first coupler 340 in a press fit. Each modular lightpipe 310 connects to an adjacent modular lightpipe 310 through engagement of first coupler 390 and second coupler 350. Detachable tabs 320 may be removed from modular lightpipes 310b and 310c to reduce the footprint of lightpipe system 300. Each first spacer 370, second spacer 380, first coupler 390, and second coupler 350 may be formed with identical or different widths to provide the desired spacing consistent with light sources 110 on PCB 100 and windows 210 on visual display 200.

Although the description of lightpipe system 300 has been with respect to a horizontal arrangement of modular lightpipes 310, lightpipe system 300 contemplates other visual display configurations. For example, suppose the linear array of light sources 110 were rotated ninety degrees about the first light source, and windows 210 were rotated ninety degrees about the first window 210. Nodular lightpipes 310 may stack vertically on top of each other using similar first couplers 340 and second couplers 350. Lightpipe system 310 contemplates any arrangement or combination of modular lightpipes 310 to present a linear, two-dimensional, or other suitable configuration of indicator lights on visual display 200.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A lightpipe system for transferring light from light-emitting diodes (LEDs) on a printed circuit board (PCB) to a display, the lightpipe system comprising a plurality of lightpipes configured to be modularly coupled to other lightpipes.

2. The lightpipe system of claim 1, wherein one of the lightpipes is configured to be modularly coupled to another lightpipe using a press fit.

3. The lightpipe system of claim 1, wherein the lightpipe system comprises:

a first coupler operable to couple to a first adjacent lightpipe; and a second coupler operable to couple to a second adjacent lightpipe.

4. The lightpipe system of claim 1, wherein each lightpipe comprises:

a first aperture operable to receive light from a corresponding LED;

a transfer channel operable to communicate the light from the first aperture to a second aperture; and the second aperture operable to emit light at a display.

5. The lightpipe system of claim 1, wherein the lightpipe system comprises:

a first coupler;

a second coupler; and a spacer;
wherein one of the lightpipes is disposed between the first coupler and the spacer, and one of the lightpipes is disposed between the second coupler and the spacer.

6. The lightpipe system of claim 1, wherein the lightpipe system comprises a detachable alignment protuberance to insert into a corresponding alignment hole on a (PCB).

7. An electronic assembly, comprising:
a printed circuit board (PCB) having a plurality of light sources;
a display; and
a plurality of lightpipes configured to be modularly coupled to other lightpipes and operable to communicate light from the light sources to the display.

8. The electronic assembly of claim 7, wherein one of the lightpipes is configured to be modularly coupled to another lightpipe using a press fit.

9. The electronic assembly of claim 7, wherein the plurality of lightpipes comprises:
a first coupler operable to couple to a first adjacent lightpipe; and
a second coupler operable to couple to a second adjacent lightpipe.

10. The electronic assembly of claim 7, wherein each lightpipe comprises:
a first aperture operable to receive light from a corresponding light source;
a transfer channel operable to communicate the light from the first aperture to a second aperture; and
the second aperture operable to emit light at the display.

11. The electronic assembly of claim 7, wherein the plurality of lightpipes comprises:
a first coupler;
a second coupler; and
a spacer;
wherein one of the lightpipes is disposed between the first coupler and the spacer, and
one of the lightpipes is disposed between the second coupler and the spacer.

12. A modular lightpipe, comprising:
a first coupler operable to couple to a first adjacent lightpipe;
a second coupler operable to couple to a second adjacent lightpipe;
a spacer;
a first transfer channel disposed between the first coupler and the spacer; and
a second transfer channel disposed between the second coupler and the spacer.

13. The modular lightpipe of claim 12, wherein the first coupler, the second coupler, the spacer, the first transfer channel, and the second transfer channel are integrally formed from a light conducting material.

14. The modular lightpipe of claim 12, further comprising a detachable alignment protuberance to insert into a corresponding alignment hole in a printed circuit board (PCB).

15. A lightpipe system for transferring light from light-emitting diodes (LEDs) on a printed circuit board (PCB) to a display, the lightpipe system comprising a plurality of modular lightpipes coupled together, wherein each modular lightpipe further comprises a detachable tab having a hole to receive a fastener chat couples the modular lightpipe to the (PCB).

16. The lightpipe system of claim 15, wherein a first modular lightpipe couples to a second modular lightpipe using a press fit.

17. The lightpipe system of claim 15, wherein each modular lightpipe comprises:
a first coupler operable to couple to a first adjacent lightpipe; and
a second coupler operable to couple to a second adjacent lightpipe.

18. The lightpipe system of claim 15, wherein each modular lightpipe comprises:
a first aperture operable to receive light from a corresponding LED;
a transfer channel operable to communicate the light from the first aperture to a second aperture; and
the second aperture operable to emit light at the display.

19. The lightpipe system of claim 15, wherein each modular lightpipe comprises:
a first coupler;
a second coupler;
a spacer;
a first transfer channel disposed between the first coupler and the spacer; and
a second transfer channel disposed between the second coupler and the spacer.

20. The lightpipe system of claim 15, wherein each modular lightpipe comprises at least two transfer channels.

21. The lightpipe system of claim 15, wherein each modular lightpipe comprises a detachable alignment protuberance to insert into a corresponding alignment hole on the PCB.

22. An electronic assembly, comprising:
a printed circuit board (PCB) having a plurality of light sources;
a display; and
a plurality of modular lightpipes coupled together and operable to communicate light from the light sources to the display, wherein each modular lightpipe further comprises a detachable tab having a hole to receive a fastener that couples the modular lightpipe to the PCB.

23. The electronic assembly of claim 22, wherein a first modular lightpipe couples to a second modular lightpipe using a press fit.

24. The electronic assembly of claim 22, wherein each modular lightpipe comprises:
a first coupler operable to couple to a first adjacent lightpipe; and
a second coupler operable to couple to a second adjacent lightpipe.

25. The electronic assembly of claim 22, wherein each modular lightpipe comprises:
a first aperture operable to receive light from a corresponding light source;
a transfer channel operable to communicate the light from the first aperture to a second aperture; and
the second aperture operable to emit light at the display.

26. The electronic assembly of claim 22, wherein each modular lightpipe comprises:
a first coupler;
a second coupler;
a spacer;
a first transfer channel disposed between the first coupler and the spacer; and
a second transfer channel disposed between the second coupler and the spacer.

27. The electronic assembly of claim 22, wherein each modular lightpipe comprises at least two transfer channels.

28. A modular lightpipe, comprising:

a first coupler, wherein the first coupler comprises a male coupling;

a second coupler, wherein the second coupler comprises a female coupling;

a spacer;

a first transfer channel disposed between the first coupler and the spacer; and a second transfer channel disposed between the second coupler and the spacer, wherein the transfer channels are operable to receive light from light sources on a printed circuit board and communicate it to a display.

29. The modular lightpipe of claim 28, wherein the first coupler, the second coupler, the spacer, the first transfer channel, and the second transfer channel are integrally formed from a light conducting material.

30. The modular lightpipe of claim 28, further comprising a detachable tab having a hole to receive a fastener that couples the modular lightpipe to a printer circuit board (PCB).

31. The modular lightpipe of claim 28, further comprising a detachable alignment protuberance to insert into a corresponding alignment hole is a printed circuit board (PCB).

32. A modular lightpipe, comprising:

a first coupler;

a second coupler;

a spacer;

a detachable tab having a hole to receive a fastener that couples the modular lightpipe to a printed circuit board (PCB);

a first transfer channel disposed between the first coupler and the spacer; and a second transfer channel disposed between the second coupler and the spacer.

33. The modular lightpipe of claim 32, wherein the first coupler, the second coupler, the spacer, the first transfer channel, and the second transfer channel are integrally formed from a light conducting material.

34. The modular lightpipe of claim 32, wherein:

the first coupler comprises a male coupling; and the second coupler comprises a female coupling.

35. The modular lightpipe of claim 32, further comprising a detachable alignment protuberance to insert into a corresponding alignment hole in a printed circuit board (PCB).

* * * * *

UNITED STATES PATENT AND TRADEMARK OFFICE
CERTIFICATE OF CORRECTION

PATENT NO. : 6,463,204 B1
DATED : October 8, 2002
INVENTOR(S) : Babi P. Ati

It is certified that error appears in the above-identified patent and that said Letters Patent is hereby corrected as shown below:

Column 2,
Line 1, after "lightpipe" delete ",".
Line 67, after "couplers" delete "390" and insert -- 340 --.

Column 3,
Line 4, after "unused first coupler", delete "390" and insert -- 340 --.
Line 11, after "each", delete "proturbance" and insert -- protuberance --.
Line 12, after "corresponding", delete "proturbance" and insert -- protuberance --.
Line 14, after "and/or", delete "proturbances" and insert -- protuberances --.
Line 42, after "second transfer channel", delete "319" and insert -- 314 --.

Column 4,
Line 1, after "one or more tabs", delete "339" and insert -- 334 --.
Lines 6, 12 and 16, after "first coupler", delete "390" and insert -- 340 --.
Line 26, after "first window 210.", delete "Nodular" and insert -- Modular --.

Column 5,
Line 63, after "receive a fastener", delete "chat" and insert -- that --.

Column 7,
Line 21, after "lightpipe to a", delete "printer" and insert -- printed --.
Line 25, after "alignment hole", delete "is" and insert -- in --.

Signed and Sealed this

Twenty-seventh Day of May, 2003

JAMES E. ROGAN
*Director of the United States Patent and Trademark Office*